United States Patent
Kwon

(10) Patent No.: US 10,737,733 B2
(45) Date of Patent: Aug. 11, 2020

(54) TRUCK

(71) Applicants: Hyundai Motor Company, Seoul (KR); Kia Motors Corporation, Seoul (KR)

(72) Inventor: Jin Young Kwon, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/201,829

(22) Filed: Nov. 27, 2018

(65) Prior Publication Data

US 2020/0102025 A1 Apr. 2, 2020

(30) Foreign Application Priority Data

Oct. 2, 2018 (KR) .................. 10-2018-0117270

(51) Int. Cl.
| | | |
|---|---|---|
| *B62D 33/03* | (2006.01) | |
| *E05D 3/02* | (2006.01) | |
| *E05D 11/10* | (2006.01) | |
| *E05D 5/06* | (2006.01) | |
| *B62D 33/027* | (2006.01) | |

(52) U.S. Cl.
CPC ............ *B62D 33/03* (2013.01); *E05D 3/02* (2013.01); *E05D 5/062* (2013.01); *E05D 11/1007* (2013.01); *E05D 11/1057* (2013.01); *B62D 33/0273* (2013.01); *E05Y 2201/218* (2013.01); *E05Y 2201/246* (2013.01); *E05Y 2900/546* (2013.01)

(58) Field of Classification Search
CPC .. B62D 33/03; B62D 33/0273; B62D 33/037; E05D 3/02; E05D 11/1007; E05D 5/062; E05D 11/1057; E05Y 2900/546; E05Y 2201/218; E05Y 2201/246; B60J 5/107
USPC ........................................ 296/186.4
See application file for complete search history.

(56) References Cited

U.S. PATENT DOCUMENTS

| | | | | | |
|---|---|---|---|---|---|
| 3,387,406 | A | * | 6/1968 | Coker ............... | E05B 83/16 49/192 |
| 3,623,764 | A | * | 11/1971 | Jacobus ............ | B60J 5/103 296/50 |
| 5,516,178 | A | * | 5/1996 | Grant ............... | B62D 33/0273 296/180.5 |
| 5,685,594 | A | * | 11/1997 | Harper ............. | B62D 33/0273 292/175 |
| 7,481,479 | B1 | * | 1/2009 | Townson ......... | B62D 33/0273 16/223 |
| 8,070,208 | B2 | * | 12/2011 | Zielinsky ......... | B62D 33/0273 16/82 |
| 8,246,098 | B2 | * | 8/2012 | Cheung ............ | B62D 33/0273 16/366 |
| 8,740,279 | B1 | * | 6/2014 | McGoff ........... | E05B 83/20 296/51 |
| 9,784,348 | B2 | * | 10/2017 | Castelblanco .... | F16H 21/44 |

(Continued)

*Primary Examiner* — Pinel E Romain
(74) *Attorney, Agent, or Firm* — Morgan, Lewis & Bockius LLP

(57) ABSTRACT

A truck may include a cargo box in which cargo is loaded, wherein the cargo box includes a loading portion having an upper side on which the cargo is loaded, a gate having a lower end portion rotatably disposed on an end portion of the loading portion to rotate and configured to open or close a rear of the cargo box, and a gate support device configured to set an opening angle of the gate.

14 Claims, 6 Drawing Sheets

(56) References Cited

U.S. PATENT DOCUMENTS

| | | | |
|---|---|---|---|
| 9,855,884 B2* | 1/2018 | Camp | B62D 33/03 |
| 10,308,291 B2* | 6/2019 | Seki | B62D 33/0273 |
| 2011/0163565 A1* | 7/2011 | Zielinsky | B62D 33/0273 |
| | | | 296/57.1 |
| 2012/0324793 A1* | 12/2012 | Abbasi | B62D 33/0273 |
| | | | 49/168 |

* cited by examiner

TRUCK

CROSS-REFERENCE TO RELATED APPLICATION

The present application claims priority to Korean Patent Application No. 10-2018-0117270, filed on Oct. 2, 2018 in the Korean Intellectual Property Office, the entire contents of which is incorporated herein for all purposes by this reference.

BACKGROUND OF THE INVENTION

Field of the Invention

Embodiments of the present invention relates to a truck having a gate configured to open a cargo box in a backward direction or a lateral direction thereof.

Description of Related Art

In general, a truck is a vehicle including a cargo box for loading cargo in a rear side thereof.

The cargo box may include a loading portion having an upper surface on which the cargo is loaded, a pair of side gates having lower ends rotatably disposed on both side ends of the loading portion to be capable of laterally opening the cargo box, and a rear gate having a lower end rotatably disposed on a rear end of the loading portion to be capable of opening the cargo box in a backward direction thereof.

The gates generally rotate 180° on the basis of the lower ends thereof to open, or maintain an open state at approximately 90° through a chain or the like.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a truck configured to variously set an opening angle of a rear gate.

Additional aspects of the disclosure will be set forth in portion in the description which follows and, in part, will be obvious from the description, or may be learned by practice of the disclosure.

In accordance with another aspect of the present invention, a truck may include a cargo box in which cargo is loaded, wherein the cargo box may include a loading portion having an upper side of which the cargo is loaded, a gate having a lower end portion rotatably disposed on an end portion of the loading portion to rotate and configured to open or close a rear of the cargo box, and a gate support device configured to set an opening angle of the gate.

The gate may include a rear gate having a lower end portion rotatably disposed on a rear end portion of the loading portion so that the cargo box opens in a backward direction thereof.

The gate may include a pair of side gates having lower end portions rotatably disposed on both side end portions of the loading portion to laterally open the cargo box.

The gate supporter may include a locking guide including an arc-shaped guide slot configured to extend downward and backward, a lever configured to selectively restrict rotation of the locking guide disposed to pass through the guide slot, and a pair of hinge brackets configured to rotatably support both sides of the lever.

The pair of hinge brackets may include a pair of hinge parts spaced from each other and having the locking guide disposed therebetween.

The locking guide may include a plurality of locking grooves provided in an external circumferential surface of the guide slot and spaced in a circumferential direction thereof, and the lever may include a pair of shaft parts rotatably disposed at the pair of hinge brackets, and a locking protrusion configured to protrude radially outwardly from the pair of shaft parts to be selectively engaged with one of the plurality of locking grooves.

The lever may connect the pair of shaft parts and include a gripping portion extending to protrude in one lateral direction on the basis of the pair of shaft parts.

Each of the pair of shaft parts may include the locking protrusion, the locking guide may include a pair of locking guides corresponding to the pair of shaft parts, and the hinge bracket may include one hinge bracket corresponding to one side shaft portion of the pair of shaft parts, and another hinge bracket corresponding to the other side shaft portion of the pair of shaft parts.

The truck may further include a spring configured to elastically support the lever to allow the lever to rotate in one direction thereof.

The spring may include a spiral elastic portion, and a pair of leg parts configured to protrude from both sides of the elastic portion to be supported by the lever and the hinge bracket.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
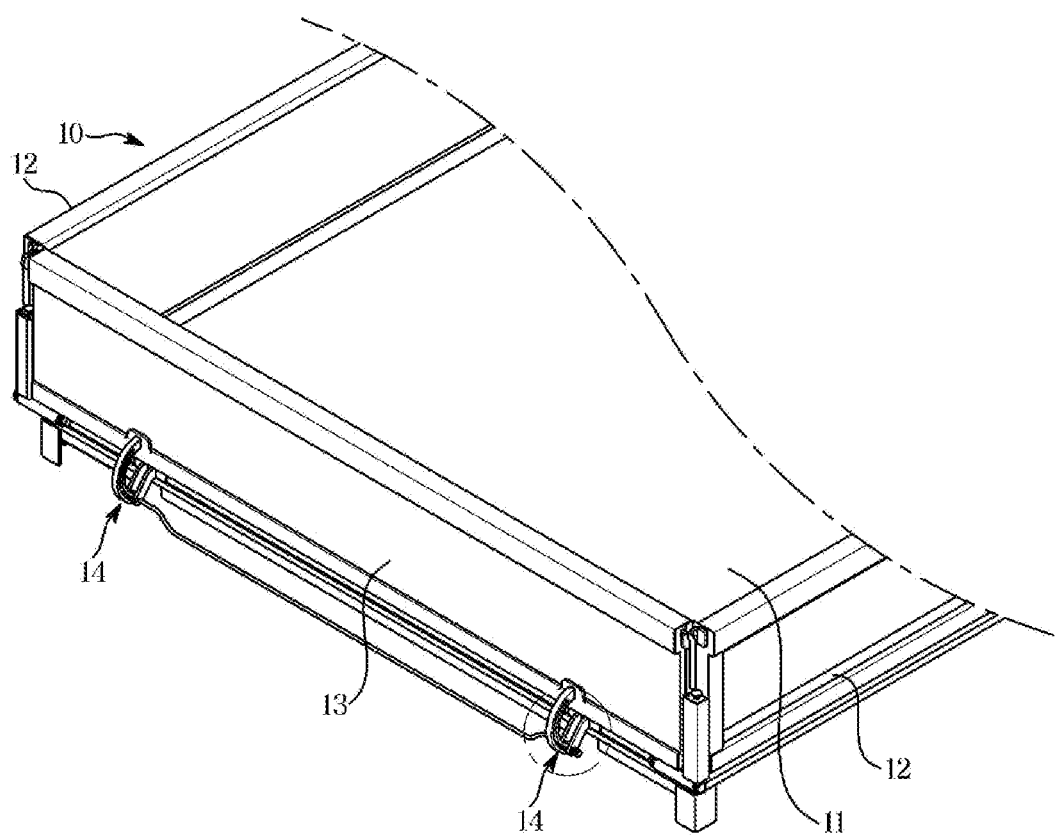
FIG. 1 is a perspective view exemplarily illustrating a state in which a rear end portion of a cargo box of a truck according to an exemplary embodiment of the present invention is closed by a rear gate.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, according to an exemplary embodiment of the present invention will be described in detail with reference to the accompanying drawings.

Figure 2:
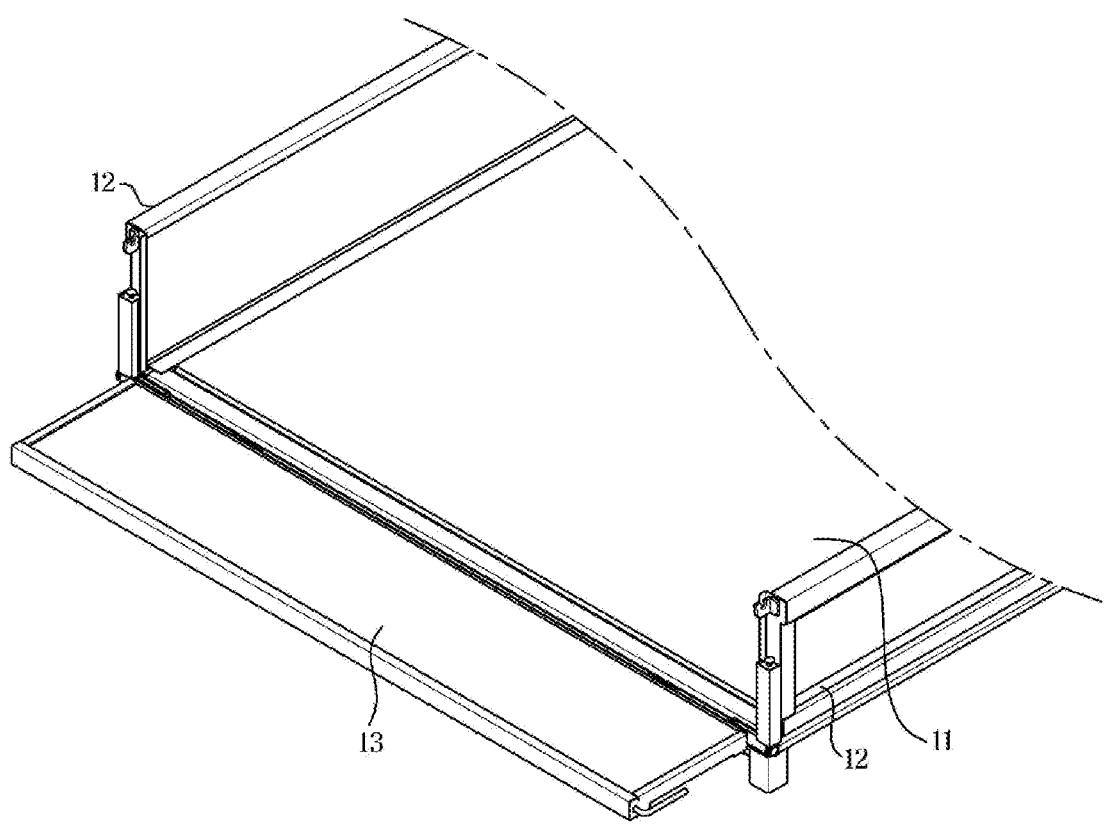
FIG. 2 is a perspective view exemplarily illustrating a state in which the rear end portion of the cargo box of the truck according to the exemplary embodiment of the present invention is open.

Referring to FIG. 1 and FIG. 2, a truck may include a cargo box 10 to be configured for loading cargo.

The cargo box 10 includes a loading portion 11 having an upper surface of which the cargo is loaded, a pair of side gates 12 having lower end portions rotatably disposed on both side end portions of the loading portion 11 to be configured for laterally opening the cargo box 10, and a rear gate 13 having a lower end portion rotatably disposed on a rear end portion of the loading portion 11 to be configured for opening the cargo box 10 in a backward direction thereof.

Furthermore, the truck includes a gate support device 14 configured to allow a user to select an opening angle of the rear gate 13.

Figure 3:
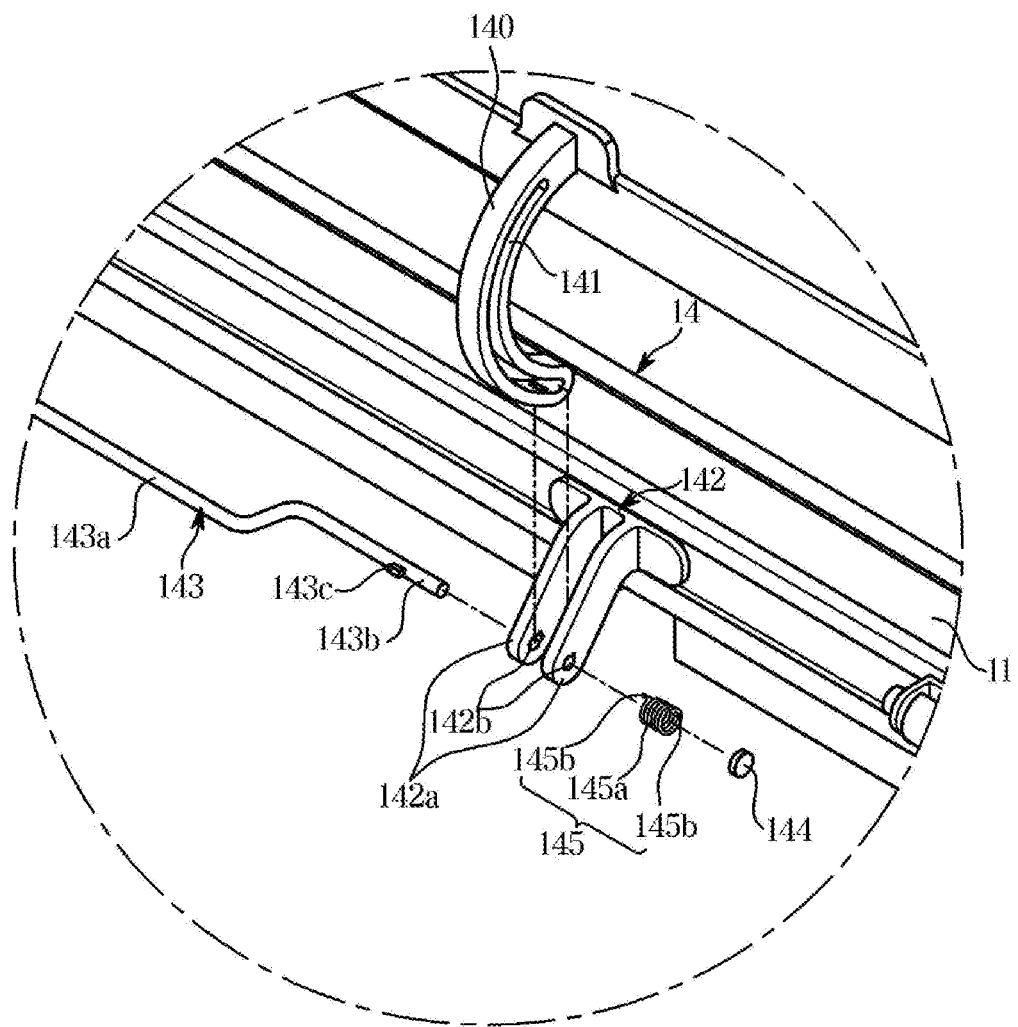
FIG. 3 is an exploded perspective view of a gate support device applied to the truck according to the exemplary embodiment of the present invention.

As shown in FIG. 3, the gate support device 14 includes a locking guide 141 configured to downwardly extend in an arc shape from the rear gate 13 in a backward direction, a lever 143 configured to allow the user to selectively rotate the rear gate 13, and a pair of hinge brackets 142 disposed so that both end portions of the lever 143 are rotatable.

Figure 4:
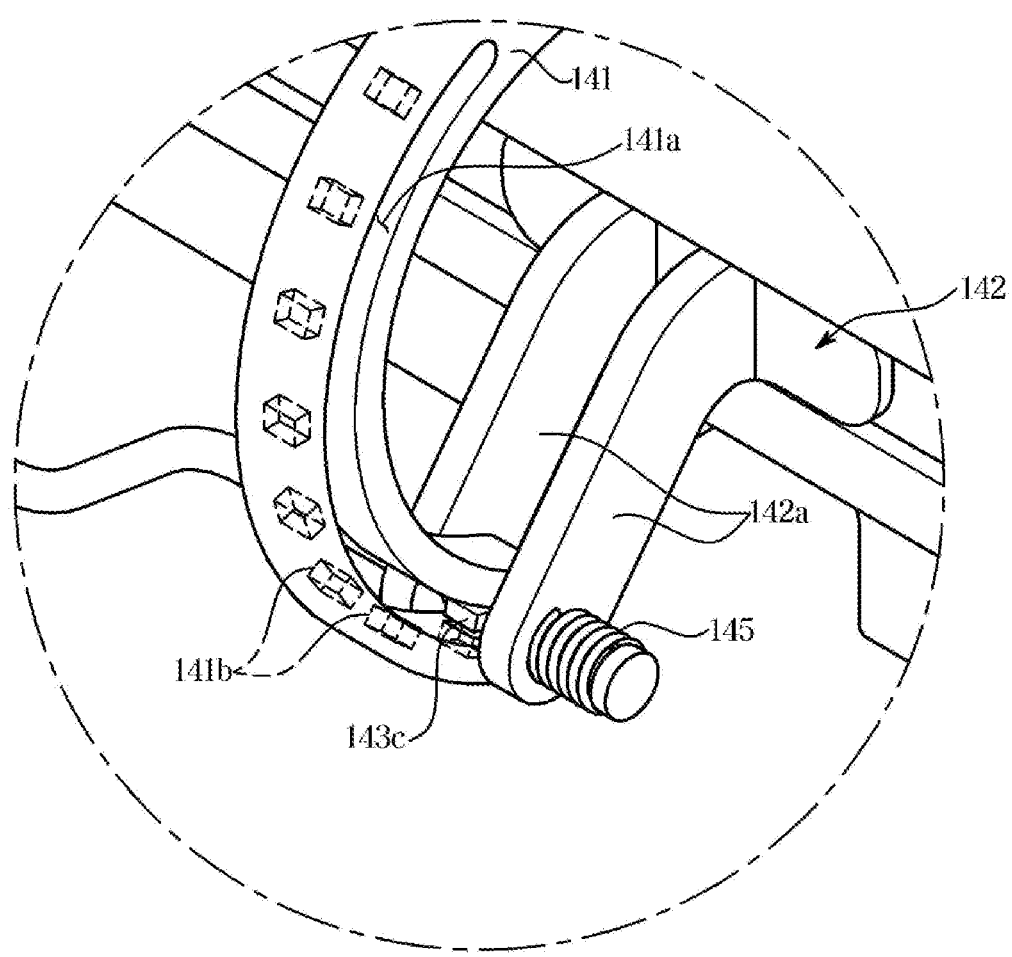
FIG. 4 is a perspective view of the gate support device applied to the truck according to the exemplary embodiment of the present invention.
Figure 5:
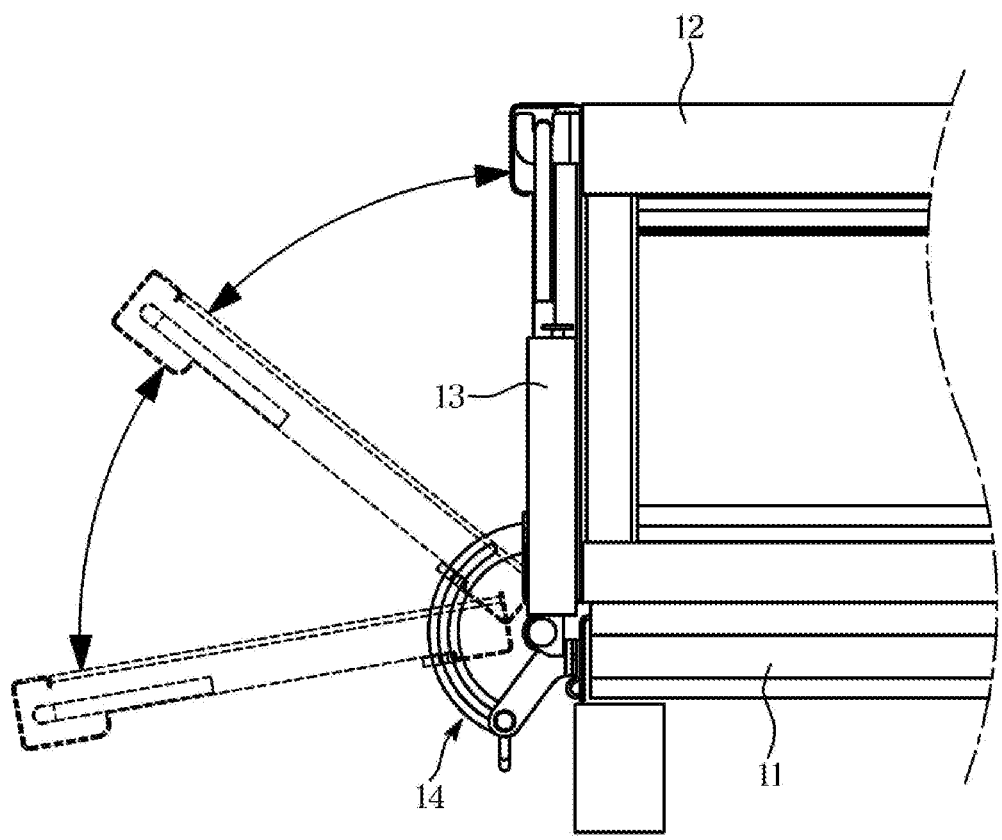
FIG. 5 is a cross-sectional view of the gate support device applied to the truck according to the exemplary embodiment of the present invention.

As shown in FIG. 4 and FIG. 5, the locking guide 141 includes a guide slot 141a provided in a downward arc shape in a backward direction thereof, and locking grooves 141b concavely provided in an external circumferential surface of the guide slot 141a. The locking grooves 141b are provided to be spaced from each other in a circumferential direction thereof. The locking guide 141 is disposed between two hinge parts 142a of the hinge bracket 142 which will be described below, and shaft parts 143b and a locking protrusion 143c which will be described below are disposed at the internal to the guide slot 141a.

The lever 143 includes a pair of shaft parts 143b provided at both end portions thereof to be rotatably disposed on the two hinge brackets 142, a gripping portion 143a configured to connect the two shaft parts 143b and protrude in one lateral direction (a downward direction in the drawing) on the basis of the shaft parts 143b to allow the user to easily rotate the lever 143, and the locking protrusion 143c configured to protrude radially outwardly from the shaft portion 143b to be selectively engaged with one of the locking grooves 141b. Furthermore, the lever 143 includes a cap 144 fixed to an end portion of the shaft portion 143b passing through and disposed at the hinge bracket 142 to prevent separation of the shaft portion 143b from the hinge bracket 142.

The above-described locking guide 141 extends in a backward direction from both sides of a rear surface of the rear gate 13 to correspond to the two shaft parts 143b, and the pair of hinge brackets 142 are disposed at both sides of the loading portion 11 to correspond to the two shaft parts 143b and the two locking guides 141.

Since the pair of hinge brackets 142 are fixed to both sides of the rear end portion of the loading portion 11, one side shaft portion of the two shaft parts 143b is rotatably disposed at the one hinge bracket 142 of the pair of hinge brackets 142, and the other side shaft portion is rotatably disposed at the other hinge bracket 142.

The hinge brackets 142 each include a pair of hinge parts 142a configured to extend downward and backward with a slope. The hinge parts 142a provided in the hinge bracket 142 are spaced from each other and the above-described locking guide 141 is disposed between the hinge parts 142a. The shaft portion 143b passes through lower portions of the hinge parts 142a to be disposed, and hinge holes 142b configured to rotatably support the shaft portion 143b are provided in the hinge parts 142a.

Accordingly, one side shaft portion of the pair of shaft parts 143b passes through the hinge holes 142b of the hinge parts 142a provided in one of the two hinge brackets 142 to be disposed, and the other side shaft portion passes through the hinge holes 142b of the hinge parts 142a provided in the other hinge bracket 142.

Furthermore, the gate support device 14 includes a spring 145 configured to elastically support the lever 143 so that the lever 143 rotates in one direction thereof. The spring 145 includes an elastic portion 145a formed in a spiral shape and configured to generate an elastic force, and a pair of leg parts 145b configured to extend toward both sides from the elastic portion 145a to be supported by the hinge bracket 142 and the lever 143.

Hereinafter, a switching operation of the rear gate 13 in the above-described truck will be described.

In a state in which the rear gate 13 closes a rear side of the cargo box 10, since the locking protrusion 143c remains a state engaged with the locking groove 141b, a state in which the rear gate 13 closes the rear side of the cargo box 10 is maintained by the locking protrusion 143c and the locking groove 141b.

When the user grips the gripping portion 143a and rotates the lever 143 in the one direction thereof, the locking protrusion 143c rotates around the shaft portion 143b to be separated from the locking groove 141b. In the instant case, when the user rotates the rear gate 13 in a backward direction thereof, the rear side of the cargo box 10 opens. In the instant case, the spring 145 configured to support the lever 143 is elastically transformed.

When the user rotates the rear gate 13 to a desired predetermined angle to open the rear side of the cargo box 10 and then releases a force applied to the gripping portion 143a, the spring 145 is elastically restored and thus the lever 143 is inserted into and engaged with the locking groove 141b configured to rotate in an opposite direction and in which the locking protrusion 143c is provided at a corresponding location among the locking grooves 141b.

Figure 6:
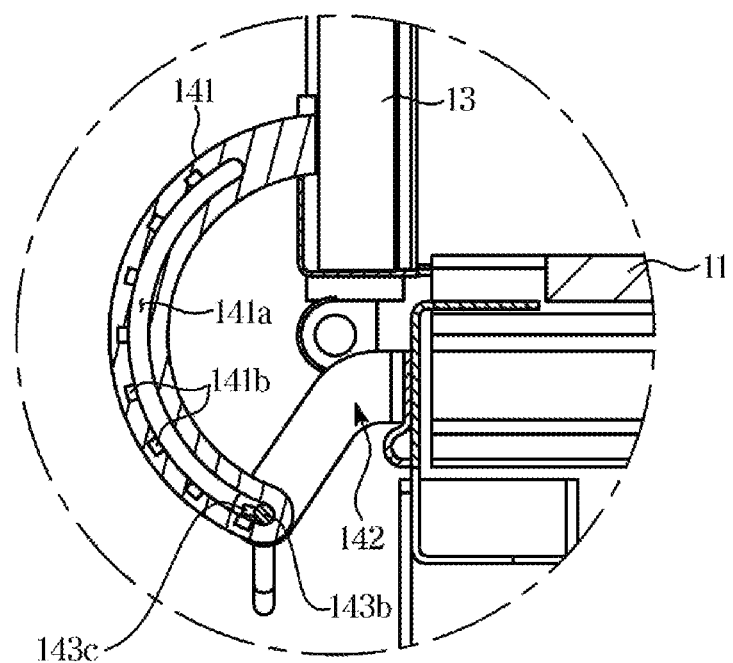
FIG. 6 is a side view exemplarily illustrating a switching operation of the rear gate applied to the truck according to the exemplary embodiment of the present invention.

Accordingly, as shown in FIG. 6, the rear gate 13 may open the rear side of the cargo box 10 at various angles set by the user using the locking protrusion 143c and the locking groove 141b.

In the exemplary embodiment of the present invention, the gate support device 14 is applied to the rear gate 13 but the present invention is not limited thereto. That is, the gate support device 14 may also be applied to the side gate 12. Furthermore, the gate support device 14 may also be applied to both the rear gate 13 and the side gate 12.

As is apparent from the above description, a truck according to an exemplary embodiment of the present invention can maintain a state in which a gate is open at various angles through a gate support device.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A truck comprising:
 a cargo box in which a cargo is configured to be loaded, wherein the cargo box includes:
 a loading portion having an upper side on which the cargo is loaded;
 a gate having a lower end portion rotatably mounted on an end portion of the loading portion to selectively rotate and configured to open or close a rear of the cargo box; and
 a gate support device mounted between the loading portion and the gate and configured to set an opening angle of the gate with respect to the loading portion.

2. The truck of claim 1, wherein the gate includes a rear gate having the lower end portion rotatably mounted on a rear end portion of the loading portion so that the cargo box selectively opens in a backward direction of the cargo box.

3. The truck of claim 1, wherein the gate includes a pair of side gates having lower end portions rotatably mounted on first and second side end portions of the loading portion to laterally open the cargo box.

4. The truck of claim 1, wherein the gate support device includes:
 a locking guide, one end of which is connected to the gate and including a guide slot;
 a lever including a shaft portion mounted to pass through the guide slot and configured to selectively restrict a rotation amount of the locking guide; and
 a hinge bracket connected to the loading portion and rotatably supporting the shaft portion of the lever.

5. The truck of claim 4, wherein the guide slot is in an arc shape extending downward and backward from the gate.

6. The truck of claim 4, wherein of the hinge bracket includes a pair of hinge portions spaced from each other and having the locking guide mounted between the hinge portions.

7. The truck of claim 6, wherein each of the pair of hinge portions include a hinge hole through which the shaft portion of the lever is rotatably mounted.

8. The truck of claim 4,
 wherein the locking guide includes a plurality of locking grooves provided in an inner circumferential surface of the guide slot and spaced to each other along the inner circumferential surface of the guide slot.

9. The truck of claim 8, wherein the lever includes:
 a locking protrusion configured to protrude radially outwardly from the shaft portion of the lever to be selectively engaged with one of the plurality of locking grooves according to a rotation of the lever.

10. The truck of claim 9,
 wherein the locking guide is in plural to form a first locking guide and a second locking guide, and
 wherein the hinge bracket is in plural to form a first hinge bracket and a second hinge bracket, and
 wherein the shaft portion of the lever is in plural to form first and second shaft portions and the first and second shaft portions are rotatably mounted at the first and second hinge brackets, respectively.

11. The truck of claim 10, wherein the lever includes a gripping portion extending from the first and second shaft portions to protrude in one lateral direction on a basis of the first and second shaft portions.

12. The truck of claim 10,
 wherein each of the first and second shaft portions includes the locking protrusion configured to protrude radially outwardly from the first and second shaft portions of the lever to be selectively engaged with one of the plurality of locking grooves of the first and second locking guides according to the rotation of the lever.

13. The truck of claim 1, further including an elastic member elastically supporting the lever to allow the lever to rotate in a predetermined direction thereof.

14. The truck of claim 13, wherein the elastic member includes:
 a spiral elastic portion; and
 a pair of leg portions configured to protrude from a first side and a second side of the elastic portion to be supported by the lever and the hinge bracket, respectively.

* * * * *